United States Patent [19]

Alberghini et al.

[11] 4,395,378

[45] Jul. 26, 1983

[54] METHOD FOR MAKING AN INJECTION STRETCH BLOW MOLDED CONTAINER WITH AN INTEGRAL TAB

[75] Inventors: Alfred C. Alberghini, Dunwoody; Gerhard E. B. Nickel, Kennesaw, both of Ga.

[73] Assignee: Sewell Plastics, Inc., Atlanta, Ga.

[21] Appl. No.: 263,765

[22] Filed: May 14, 1981

[51] Int. Cl.³ .............................................. B29C 17/07
[52] U.S. Cl. ................................... 264/532; 215/1 C; 215/100 A; 264/537
[58] Field of Search ............... 264/523, 532, 537, 538; 425/525, 533, 529; 215/1 C, 100 A

[56] References Cited

U.S. PATENT DOCUMENTS

| 3,955,697 | 5/1976 | Valyi | 264/537 X |
| 4,280,859 | 7/1981 | Thompson | 264/537 X |
| 4,287,150 | 9/1981 | Gendron | 264/538 |
| 4,298,567 | 11/1981 | Aoki | 425/525 X |

FOREIGN PATENT DOCUMENTS

| 154343 | 11/1953 | Australia | 425/525 |
| 2446163 | 9/1980 | France | 264/537 |

Primary Examiner—Jan H. Silbaugh
Attorney, Agent, or Firm—Barnes & Thornburg

[57] ABSTRACT

An injection stretch blow molded container is disclosed having an integral tab for hanging the container with the finish end down so as to facilitate removal of the contents of the container. A method of making the container is disclosed which includes the use of an injection molded parison having an integral tab of the size and dimensions desired for the container tab. The parison is then situated in a blowing mold having a pocket for receiving the integral appendage. The parison is stretched until the appendage is received in the pocket in the mold wall and then blown to form the container having a wall conforming to the interior of the blowing mold. A surface of the integral appendage performs the function of the mold wall with respect to a portion of the container.

3 Claims, 8 Drawing Figures

METHOD FOR MAKING AN INJECTION STRETCH BLOW MOLDED CONTAINER WITH AN INTEGRAL TAB

BACKGROUND OF THE INVENTION

1. Field of the Invention

This invention relates to molded containers and more specifically to injection stretch blow molded containers of the general type as disclosed in U.S. Pat. No. 3,900,120. The invention specifically relates to the container having an integral suspension tab formed by stretch blow molding an injected molded parison, the parison having as an included feature the tab sought to be included on the finished stretch blow molded container.

2. Description of the Prior Art

In U.S. Pat. No. 3,900,120, there is disclosed injection molded thermoplastic preforms or parisons designed to be stretch blow molded into a molecularly oriented container especially designed for packaging foods, beverages, or the like. There is included in that patent a complete discussion of appropriate specific materials suitable for use in the present invention and, to the extent necessary, the same is hereby incorporated by reference. Further, there is included in that patent a discussion as to the extent of stretching and blowing which can be tolerated by such an injection molded preform. These criteria have largely been adopted by the industry for the production of containers of this class. The present invention by and large incorporates the usual and customary practices in the art as described in that patent except to the extent specifically set forth in detail in the summary of the invention herein.

Generally, the parisons disclosed in U.S. Pat. No. 3,900,120 are circularly symmetrical about the axis of elongation and likewise the containers blow molded from such parisons are also circularly symmetrical about the axis of the elongation.

U.S. Pat. No. 3,726,429 discloses a stretch blow molded bottle from an extruded parison which includes a nub which extends outwardly on the axis of the cylindrical container. The nub disclosed is of relatively small size said to be between 1/32 to ¼ of an inch in length and 1/16 to ¼ of an inch in diameter. The nub is located on the lower extremity of the container and is intended to be thermally welded to a support upon which the container can rest with the elongation axis being coincidental with a vertical line.

U.S. Pat. No. 4,176,153 discloses yet another container blow molded from an extruded parison, a portion of which extends above the blowing mold. After the container has been blow molded, the upwardly extending portion is shaped into a flat tab, and an aperture is cut therein so as to permit the formed container to be hung by the flat tab.

While it is known to form a tab during the creation of an extrusion blow molded bottle, the forming of bottles having integral tabs from an injection molded parison has not heretofore been done. It is therefore an object of the present invention to create an injection stretch blow molded container with an integral tab. It is a further object of the present invention to create such a container wherein the tab is integrally formed with the parison when the parison is injection molded. It is a further object of the present invention to provide a mold cavity for blow molding such a container having a recess therein for accepting the formed tab on the parison.

SUMMARY OF THE INVENTION

The various objects of the present invention are achieved by employing a novel method of forming a container having an integral appendage comprising the steps of molding a parison having an integral appendage, situating the parison in a blow mold having a pocket such that the pocket receives the appendage, and blowing the parison to form a container at a temperature at which the parison can be blown while the appendage will remain substantially undeformed. In the novel method of the present invention, a first portion of the parison is situated with respect to the blowing mold such that the first portion constitutes a continuation of the mold surface. The parison is then blown such that another portion of the parison, when blown, comes into surface contact with the first portion, the first portion performing the function of a mold wall with respect to said another portion.

The injection stretch blow molded container which results comprises generally a tubular container wall portion, a closed bottom portion at a lower end of the generally tubular container wall portion, a sprue artifact centrally disposed in the closed bottom portion and a suspension tab extending from the sprue artifact, the suspension tab being unitary with the other recited portions of the container. The term "sprue artifact" as used in this specification means the residual structure of an injection mold sprue on a parison after the parison has been removed from the injection mold and includes such residual structure after the parison has been stretched and blow molded into a container.

While in a preferred form of the invention the suspension tab is formed at the sprue end of the parison, it will be understood that the suspension tab might also be formed on the finish end of the container. In either event, the integral tab on the parison itself can be employed as a means for prealigning the parison with resect to the blow molding cavity such that when the parison is stretch blow molded, the tab will be received in an appropriate pocket provided for in the wall of the blowing mold. Where the pocket is provided in the base of the blowing mold, the parison can include, as an internal feature, an alignment indentation for interaction with the stretch rod so as to ensure accurate axial stretch and thus accurate placement of the tab located on the sprue end of the parison in the tab receiving pocket of a blow molding cavity.

In a preferred embodiment, the appendage or suspension tab is provided with an aperture therethrough to provide easy hanging of the finished container and is further provided with a crease, that is, a section of diminished thickness, along which the tab may be most easily bent or flexed with respect to the blow molded container.

Various features and advantages of a container made according to the present invention will become apparent to those having ordinary skill in the art upon consideration of the following discussion of the preferred embodiments together with the accompanying drawings.

DESCRIPTION OF PREFERRED EMBODIMENTS

Figure 1:
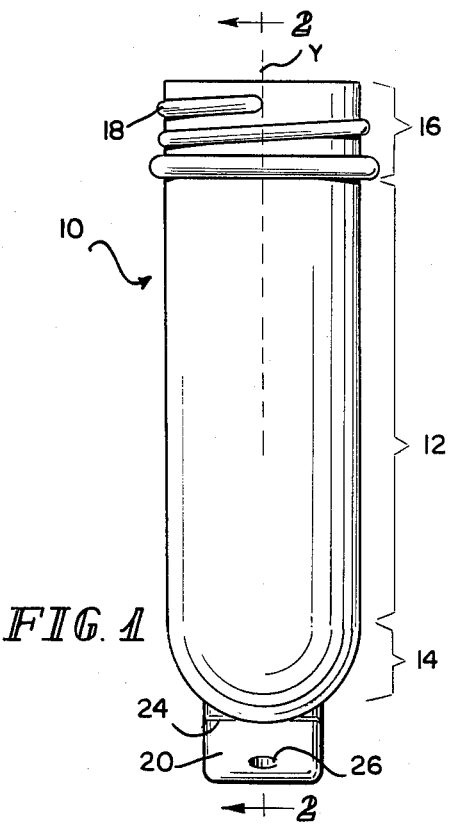
FIG. 1 is a plan view of a parison having a tab on the sprue end thereof according to the present invention.
Figure 2:
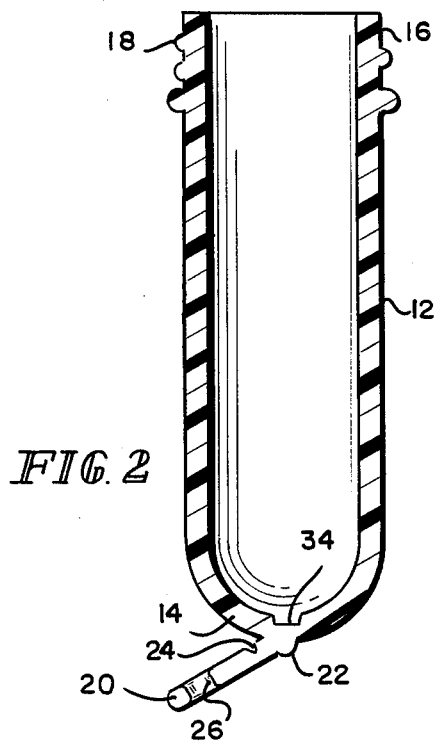
FIG. 2 is a sectional view of the parison shown in FIG. 1 cut along Line 2—2.
Figure 2A:
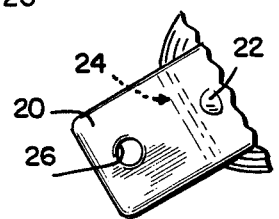
FIG. 2a is a projection of the molded tab shown on the bottom of FIG. 2.
Figure 4:
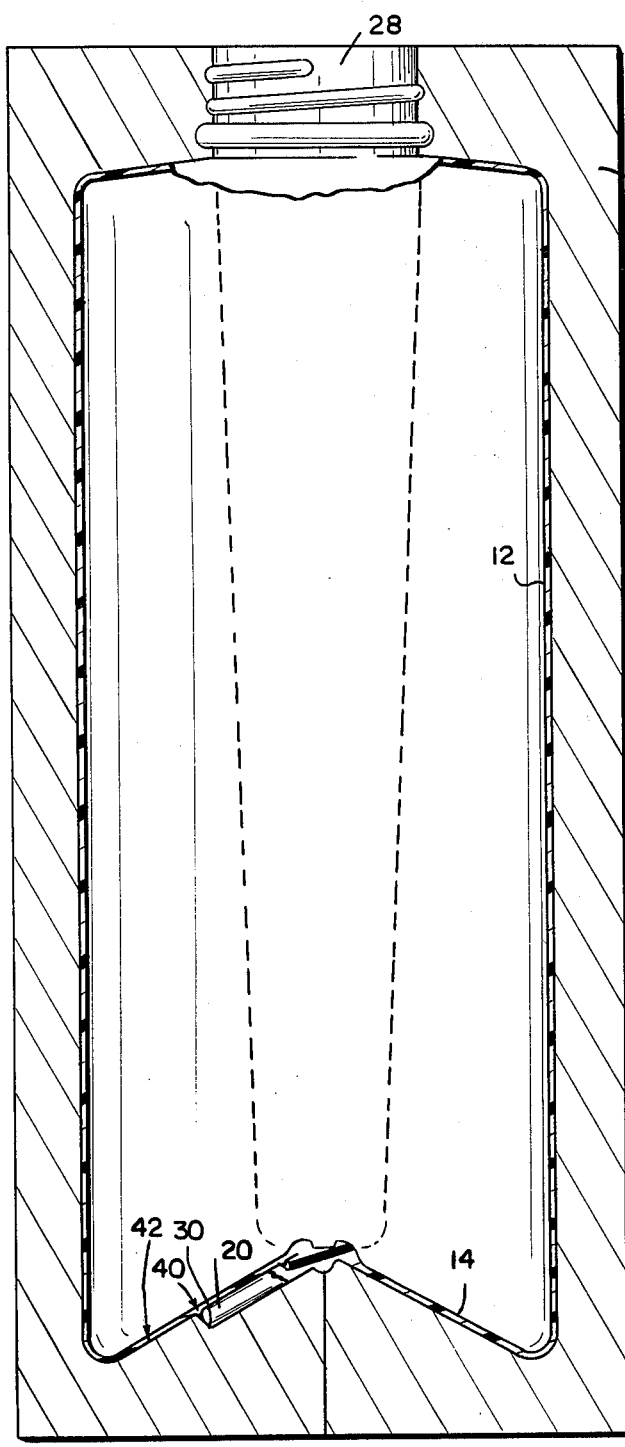
FIG. 4 is the same view of a blowing mold as that shown in FIG. 3 but with the parison having been blown to form a container with an integral tab on the sprue end thereof.

In FIG. 1, there is illustrated a one-piece parison 10 made of a high barrier, high strength thermoplastic material such as polyethylene teraphthalate or other suitable resin for molding into a molecularly oriented container according to the present invention such as that illustrated in FIG. 4. The parison 10 includes a generally tubular container wall portion 12, a closed bottom portion 14 at the lower end of the generally tubular portion 12 and a neck portion 16 which is shown in finished form in that it has closure engaging surfaces such as threads 18 for engaging an appropriate closure (not shown). Except for the threads 18, portions 12, 14 and 16 of the parison 10 are circularly symmetrical about the axis of the elongation Y. At the lower extremity of the closed bottom portion 14, there is provided a suspension tab 20 molded to the shape desired in the finished container. The tab, which is further illustrated in FIGS. 2 and 2a, is unitary with the remainder of the parison 10, and extends at an angle with respect to the elongation axis Y from the sprue artifact 22 centrally disposed on the closed bottom portion 14 of the parison 10. Preferably, the tab 20 includes at least one linear crease 24 for enabling the suspension tab 20 to be easily folded. The suspension tab 20 also preferably includes at least one aperture 26.

Figure 3:
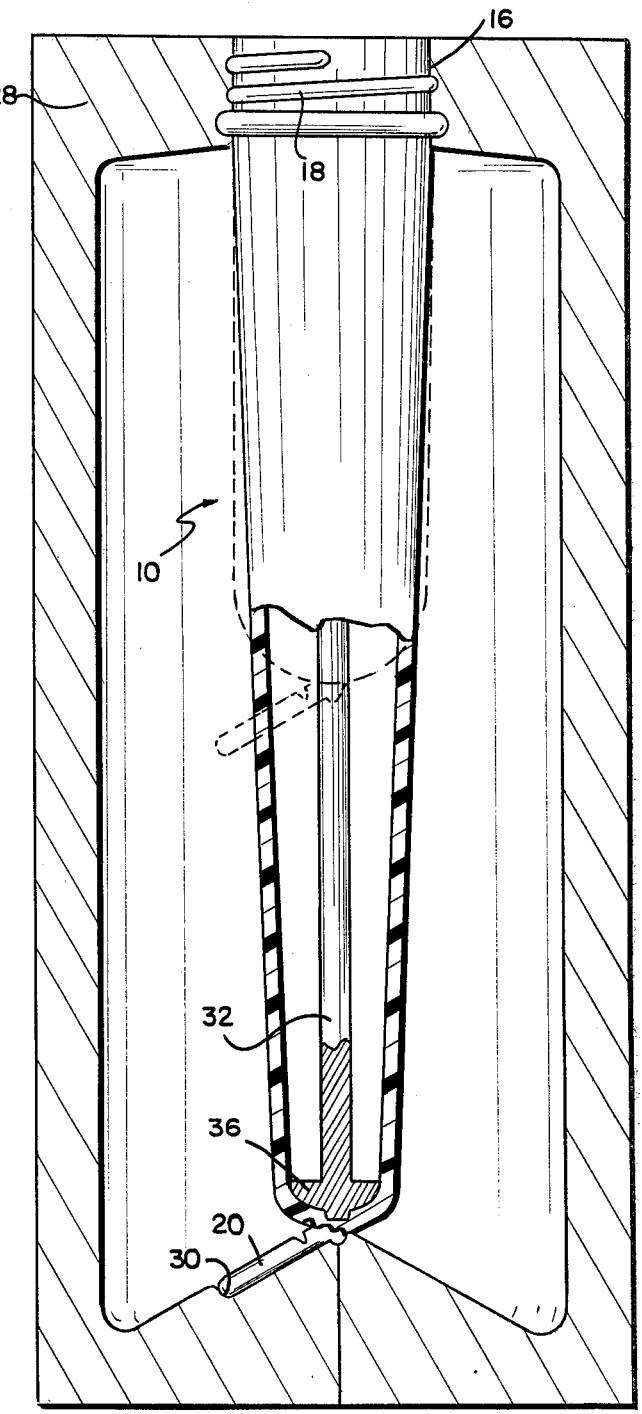
FIG. 3 is a sectional view of a blowing mold containing a parison according to the present invention with the stretch rod in the fully extended position seating the tab on the bottom of the parison in the tab-receiving slot.

In the present invention, after molding a parison having an integral appendage 20 such as that shown in FIGS. 1-2a, the parison is then situated in a blow mold 28 such as that illustrated in FIGS. 3 and 4. The parison 10 is situated with respect to the blow mold 28 such that the appendage 20 of the parison 10 is received in a pocket 30 provided in a portion of the blow mold 28. Where the appendage 20 is on the closed bottom portion 14 of the parison 10, the seating of the appendage 20 into pocket 30 occurs upon the full extension of the stretch rod 32 within the parison. To ensure proper engagement between the appendage 20 and the pocket 30, the parison 10 preferably includes an alignment feature 34 on the inside lower extremity of the parison 10. The lower end 36 of the stretch rod engages the alignment feature 34 as shown in FIG. 3 during the stretching operation of the parison from its original length, shown in FIG. 3 in phantom, to the stretched position wherein the tab 20 seats into pocket 30. Thereafter, the bottle is blown in a conventional manner.

Figure 5:
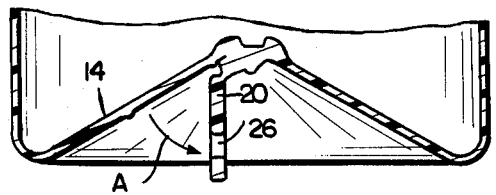
FIG. 5 shows a partial sectional detail of a container after removal from the mold shown in FIG. 4 with the suspension tab having been rotated through arc A.

When the bottle is blown, it assumes the position illustrated in FIG. 4. It is to be noted that tab 20 remains immobilized during the blowing operation in pocket 30 while an upper surface 38 of tab 20 comes into contact with a portion 40 of the wall 42 of the container during the blowing operation. In essence, the surface 38 of tab 20 performs the function of a mold wall with respect to portion 40 of the container wall. The mold is then separated from the bottle in a conventional manner whereupon the tab 20 may be bent through arc A as shown in FIG. 5 to assume a suspension position.

Figure 6:
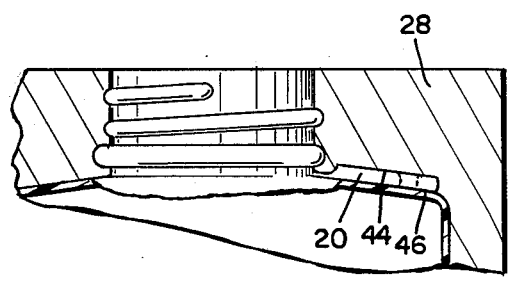
FIG. 6 illustrates an alternative embodiment wherein a tab is provided on the finish end of the parison, the tab being received in a slot in the blowing mold in accordance with the present invention.
Figure 7:
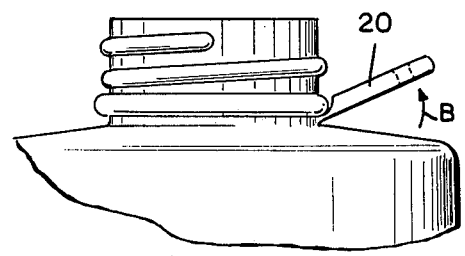
FIG. 7 shows a blow molded container after removal from the mold illustrated in FIG. 6 with the tab having been rotated through arc B.

While in FIGS. 1-5, tab 20 has been shown to be adjacent to the sprue end of the parison, it will be appreciated that such a tab or appendage 20 might also be provided near the finish end of the bottle as shown in FIG. 6. Since it is desirable that the tab not undergo any significant change in size or shape during the blowing operation, the placement of the tab is thought to be confined to that portion of the container which will not undergo significant deformation during the blowing procedure. In FIGS. 6 and 7, the tab 20 is shown to be received in a cavity 44 in mold 28 and during the blowing operation wall portion 46 of the container overlies tab 20, the tab 20 performing the function of a mold wall with respect to portion 46 of the bottle. When the bottle is removed from the mold, the tab 20 is bent through arc B to the position shown for suspension from the finish end.

Although the invention has been described in detail with reference to certain preferred embodiments and specific examples, variations and modifications exist within the scope and spirit of the invention as described and as defined in the following claims.

What is claimed is:

1. The method of forming a container having a finish end and an integral appendage opposite the finish end of the container comprising the steps of:
    (a) molding a parison having a finish end and an integral appendage formed at an end of the parison opposite the finish end,
    (b) situating the parison in a blow mold having a finish-receiving portion, a wall defining a cavity and having a pocket in the wall at a base of the mold opposite the finish-receiving portion and adjacent an axis of the mold,
    (c) stretching the parison to a point that the pocket receives the appendage, one surface of the appendage contacting the pocket portion of the wall, another surface of the appendage facing into the mold cavity, and
    (d) blowing the parison to form a container, said another surface of the appendage acting as a part of the mold wall for a portion of the blown part of the container, the appendage remaining substantially undeformed during the blowing operation.

2. The method of claim 1 wherein during the molding step, the parison is formed with an alignment feature on the inside of the parison to receive a stretch rod.

3. The method of forming an integral hanging tab on an injection stretch blow molded container for hanging the container with the finish end down so as to facilitate removal of the contents of the container, the method comprising the steps of:

(a) injection molding a parison having a finish and an integral tab on the end of the parison opposite the finish, (b) providing a blowing mold having a wall defining the interior of the mold and a pocket in the mold wall for receiving the integral tab, (c) situating the parison in the blowing mold such that the integral tab is aligned with the pocket, (d) stretching the parison until the tab is received in the pocket in the mold wall, and (e) blowing the parison to form a container having an outer surface conforming to the interior of the blowing mold, a surface of the integral appendage performing the function of the mold wall with respect to a portion of the outer surface of the container.

* * * * *